United States Patent [19]
Beyerl

[11] Patent Number: 5,361,711
[45] Date of Patent: Nov. 8, 1994

[54] APPARATUS FOR SEEDING, MULCHING, AND FERTILIZING SOIL

[76] Inventor: Donald R. Beyerl, 4179 Rte. 8, Allison Park, Pa. 15101

[21] Appl. No.: 991,119

[22] Filed: Dec. 16, 1992

[51] Int. Cl.⁵ ............................................. A01C 23/00
[52] U.S. Cl. ............................... 111/127; 366/156; 366/300; 239/142; 239/683; 239/172
[58] Field of Search ............... 239/172, 654, 663, 662, 239/142, 683, 302; 222/80, 81; 366/156, 297, 300; 111/901, 902, 130, 127; 141/329, 330; 296/37.1, 37.6

[56] References Cited

U.S. PATENT DOCUMENTS

| | | | |
|---|---|---|---|
| 1,463,944 | 8/1923 | Fishleigh | 296/37.1 X |
| 2,878,617 | 3/1959 | Finn . | |
| 3,091,436 | 5/1963 | Finn . | |
| 3,145,858 | 8/1964 | Helbig | 141/330 X |
| 3,203,631 | 8/1965 | Jutila | 239/142 X |
| 3,216,375 | 11/1965 | Ernst | 366/156 X |
| 3,219,275 | 11/1965 | Green | 239/172 |
| 3,310,237 | 3/1967 | Welch | 239/142 X |
| 3,550,965 | 12/1970 | Reinecker . | |
| 4,082,227 | 4/1978 | McGrane et al. . | |
| 4,511,284 | 6/1985 | Sterner | 239/663 X |
| 4,723,710 | 2/1988 | Lucore, II . | |
| 4,750,438 | 6/1980 | Johnson . | |
| 5,004,156 | 4/1991 | Montainier | 239/172 X |
| 5,012,974 | 5/1991 | Johnson . | |

Primary Examiner—Clifford D. Crowder
Assistant Examiner—Paul C. Lewis
Attorney, Agent, or Firm—Richard C. Litman

[57] ABSTRACT

An apparatus for seeding, mulching, and fertilizing soil is described. The apparatus includes: a mixing tank adapted for mounting upon a motorized land vehicle for containing an aqueous mixture of seed and other soil conditioning materials; an agitator positioned within said tank for combining seed and other soil conditioning materials with water; a movable spray cannon in fluid communication with the mixing tank for spraying the aqueous mixture delivered thereto by an attached pump onto the soil surface; an auxiliary hose of flexible material for spraying the aqueous mixture; a mulch blower affixed to said tank for delivering a dried mulch material to the soil surface; and, a hydraulic power transmission system for transmitting power from the motorized land vehicle to the agitator, pump, and mulch blower.

14 Claims, 4 Drawing Sheets

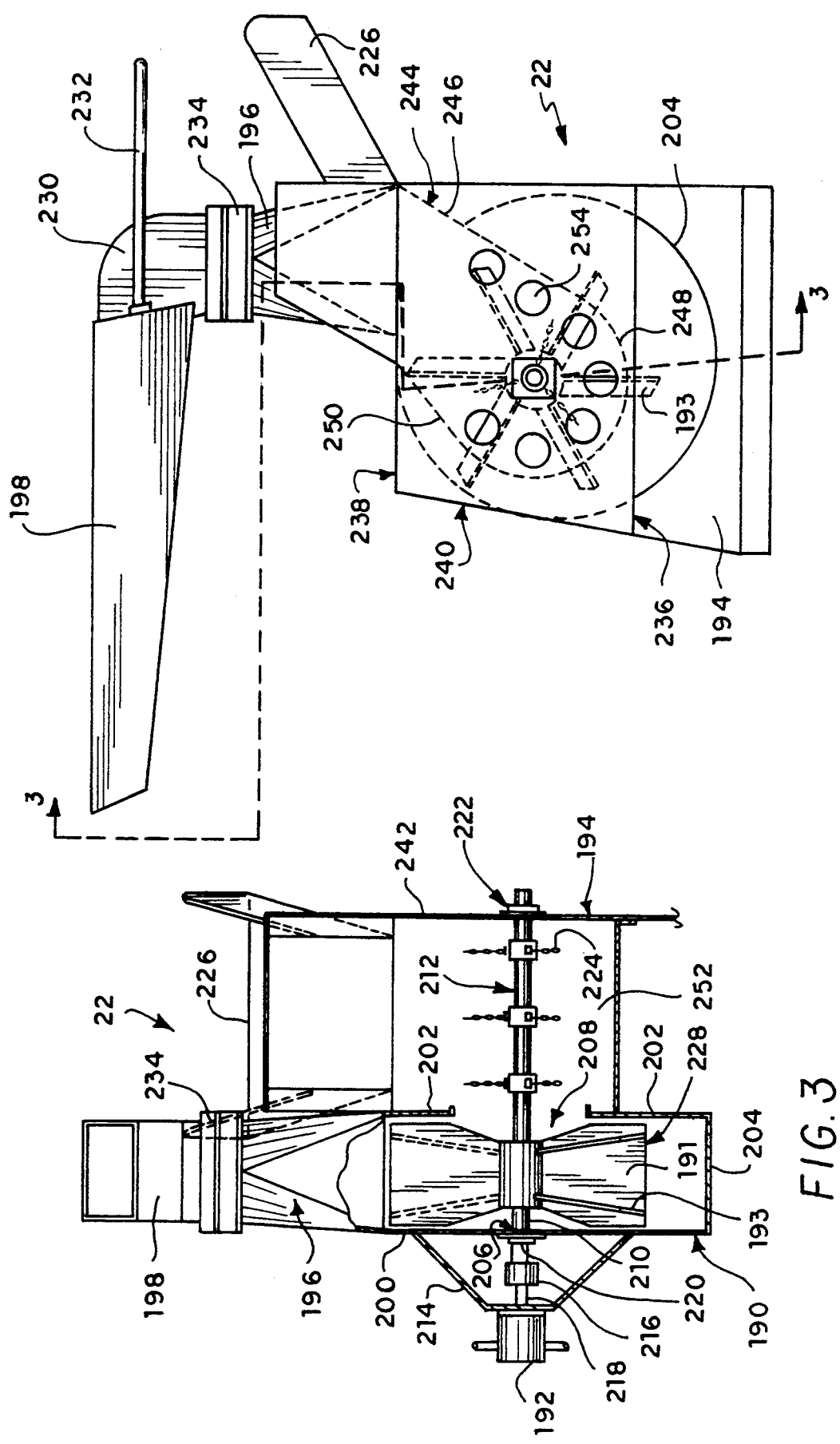

APPARATUS FOR SEEDING, MULCHING, AND FERTILIZING SOIL

FIELD OF THE INVENTION

The present invention relates generally to apparatus for fluid sprinkling, spraying and diffusing. In particular, the invention relates to an apparatus for seeding, mulching, and fertilizing soil. When used, aqueous mixtures of seed, fertilizer, lime, and other soil conditioners may be applied to designated soil areas and covered with a substantially dry mulch material such as straw or hay.

1. Background of the Invention

During the course of many large construction projects, vast areas are stripped of vegetation as an accepted part of the site preparation process. Many of these areas, particularly the great cuts through which modern roadways pass, are known for their formidable, barren and rocky slopes. Nevertheless, to stabilize, restore, and beautify areas of this type upon the completion of a construction project, the land is often painstakingly seeded, fertilized, and covered with a layer of dry mulch to promote seed germination, prevent erosion, and protect seedlings as they develop. In order to keep such planting, fertilizing, and mulching costs to a minimum, a major consideration to contractors and land developers alike, specially designed machines are frequently utilized.

2. Description of the Related Art

Machines for covering land areas with a mixture of seed, water, mulch, and fertilizer have been known for years. Many of these machines, usually referred to as "hydroseeders," include: a vehicle-mounted tank for holding an aqueous mixture of seed and other soil conditioning materials; a self-powered pumping unit in fluid communication with the tank for pressurizing the mixture; and, a nozzle in communication with the pump for spraying the pressurized mixture onto the soil surface. Other specially designed machines are typically utilized for spreading dried mulch material atop the previously sprayed seed mixture. Therein, opened bales of mulch material, such as hay, straw, and the like, are fed into a chamber where the mulch material is flailed. The mulch is next drawn by a fan and blown out of a manually aimed spout thereby forming a protective matrix atop the sprayed seed mixture.

The presently available machines for performing these functions have a number of limitations which render them less than ideal. Of the utmost importance, as contractors and developers find themselves working upon increasingly smaller tracts of land, is that the old machines are usually large in size and are designed to be separately towed or carried in piggyback fashion upon trucks or tractors. Therefore, at anything but a very large construction site, the two individual pieces of equipment required to perform the above described seeding and mulching tasks will be forced to maneuver only with the greatest difficulty. Additionally, many of the known machines are powered by internal combustion engines separate from the prime mover of the supporting land vehicle. These engines add unnecessary weight, increase maintenance and operational costs, and reduce the fluid capacity of the mixing tank. A brief review of several of the known and patented hydroseeding and mulching machines will confirm the assessment that an improved apparatus for seeding, mulching, and fertilizing soil is needed to overcome the known limitations of the prior art.

U.S. Pat. No. 2,878,617, issued Mar. 24, 1959 to Charles O. Finn, discloses a hydraulic apparatus for seeding and fertilizing. This particular apparatus includes: a tank having an agitator positioned therein for suspending solids in an aqueous solution, and a pump for delivering the suspension to a nozzle unit for distribution over the ground surface. The apparatus is shown mounted upon a land vehicle for large scale operations.

U.S. Pat. No. 3,091,436, issued May 28, 1963 to Charles O. Finn, describes a hydraulic apparatus for producing a sprayable fiber mulch having a closed chamber divided into separate suction and mixing compartments by a perforate barrier of expanded metal. An impeller type pump having an intake positioned within the suction compartment continuously withdraws the liquid contents thereof and forces the same into an elongate manifold positioned adjacent the perforate barrier and within the mixing compartment. A plurality of nozzles provided in the manifold are arranged to direct the contents thereof onto and across the surface or face of the perforate barrier. The manual resetting of a three-way valve diverts liquid from the manifold to a spray nozzle for distribution over the ground surface.

U.S. Pat. No. 3,550,965, issued Dec. 29, 1970 to Walter J. Reinecker, shows a mulching machine for spreading dried mulch or straw over seeded ground areas. The machine includes a flailing chamber for receiving opened bales of mulch material, a plurality of beating chains affixed to a rotating shaft for shredding the mulch material, and a blower for forcing the shredded material through a discharge spout and out onto the ground area to be covered. No means are provided for handling aqueous mulch slurries.

U.S. Pat. No. 4,082,227, issued Apr. 4, 1978 to Merle V. McGrane et al, provides a slurry mixer and spreader for attachment to a land vehicle. This particular device is seen to comprise a mixing tank having a screen attached to a rotatable shaft for excluding large debris from entering the tank's discharge opening and paddles also attached to the shaft for suspending solids in an aqueous solution. A spinning mechanism distributes the mixed slurry material over the area which the vehicle passes.

U.S. Pat. No. 4,723,710, issued Feb. 9, 1988 to James C. Lucore, II, discloses an apparatus for spraying mixture of solid and liquid materials having a tank without an internal, mechanical agitating device. The recycling of the liquid mixture through a hydraulic pump facilitates the continuous agitation of the mixture within the tank by a so-called "bubbling effect" and apparently eliminating the need for an in-tank agitating mechanism.

U.S. Pat. No. 4,750,438, issued Jun. 14, 1988 to Milton O. Johnson, describes a method of applying partly germinated seeds. The method employs a mechanical hydroseeder, having a nozzle large enough not to constrict the flow of seed to a point where it might be bruised, for seed distribution over the ground surface.

U.S. Pat. No. 5,012,974, issued May 7, 1991 to Jesse D. Johnson, provides a method and apparatus for applying pregerminated plantlets to the ground surface. The apparatus is seen to comprise: a mixing tank adapted for mounting upon a truck bed or mobile trailer; an agitator positioned within the tank for gently mixing an aqueous solution containing pregerminated plantlets; a first hydraulic motor for rotating the agitator; a peristaltic pump powered by a second hydraulic motor for delivering the aqueous solution to a spray nozzle; a reel powered by a third hydraulic motor for rotatably extending a nozzled hose; and, a manifold in fluid communication with each of the hydraulic motors for controlling such.

None of the above referenced patented inventions, taken either singly or in combination, is seen to describe the instant invention as claimed.

SUMMARY OF THE INVENTION

The principal object of this invention is to provide a singular apparatus for seeding and fertilizing soil areas with an aqueous mixture of soil conditioning materials as well as applying a layer of dry mulch thereby promoting seed germination, preventing erosion, and protecting seedlings as they develop.

A further object of the invention is to provide an apparatus for seeding, mulching, and fertilizing soil adapted for use with a land vehicle having an appropriate power takeoff.

A still further object of the invention is to provide an apparatus for seeding, mulching, and fertilizing soil having a fluid circulating system controlled by pneumatic cylinders and powered by hydraulic motors.

It is an object of the invention to provide improved elements in an apparatus for seeding, mulching, and fertilizing soil which is inexpensive to manufacture, dependable in use, and fully effective in accomplishing its intended purposes.

The foregoing and other objects of the instant invention will be apparent to those of ordinary skill in the art to which it pertains from the following description taken in conjunction with the accompanying drawings.

BRIEF DESCRIPTION OF THE DRAWINGS

FIG. 3 is a partial cross section of the mulch blower of the apparatus shown in FIG. 1 taken on line 3—3 of FIG. 4.

FIG. 4 is a side elevational view of the mulch blower of the apparatus shown in FIG. 1.

Similar reference characters denote corresponding features consistently throughout the attached drawings.

DETAILED DESCRIPTION OF THE PREFERRED EMBODIMENT

Figure 1:
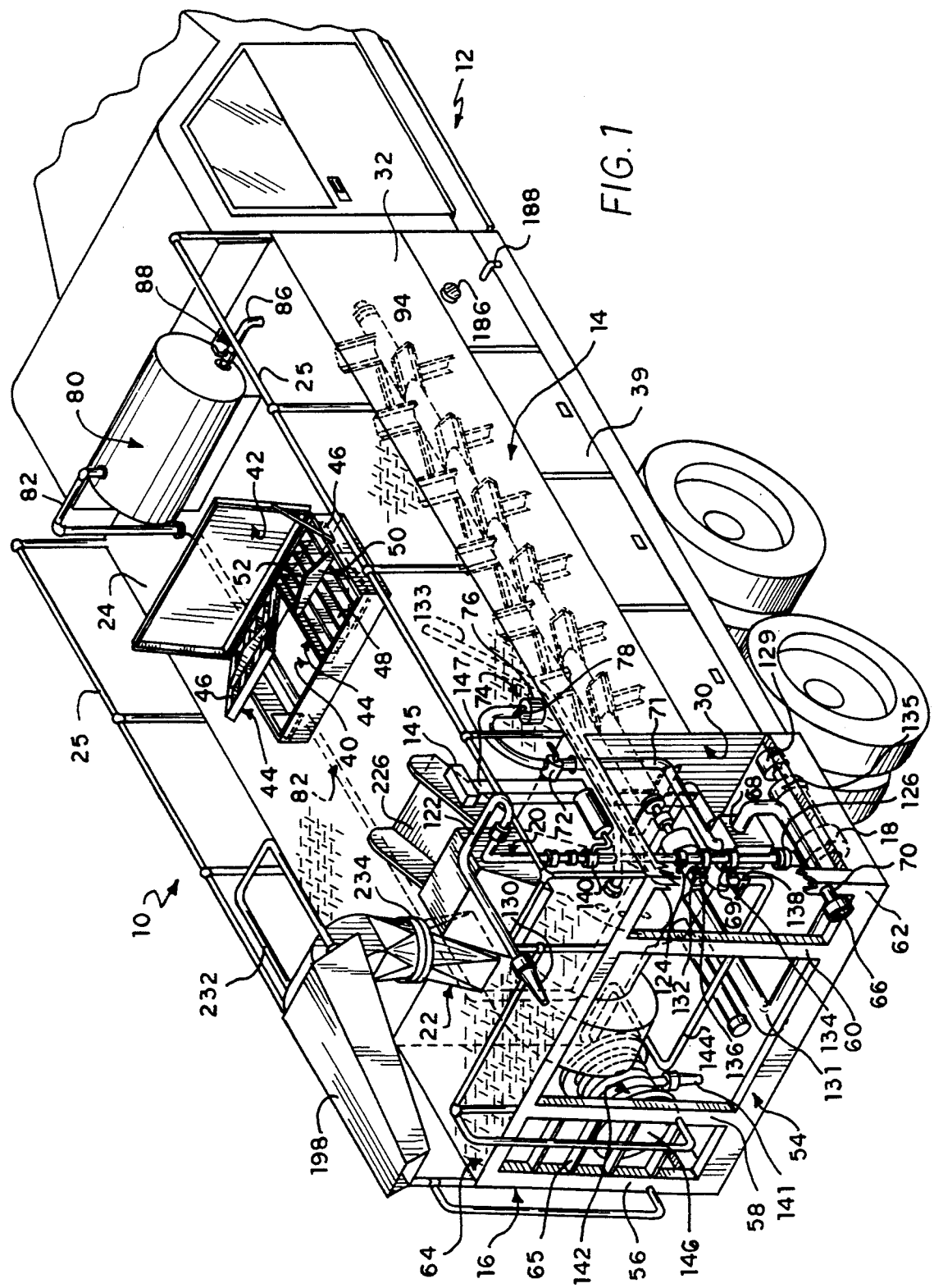
FIG. 1 is a perspective view of an apparatus for seeding, mulching, and fertilizing soil in accordance with the present invention.

Referring now to FIG. 1, an apparatus 10 for seeding, mulching, and fertilizing soil may be seen, by way of example only, mounted upon a suitable land vehicle or truck 12 for movement from place to place. Broadly, the instant apparatus comprises: a chamber or tank 14 for containing an aqueous mixture of seed and other soil conditioning materials; a frame 16 joined to the rear end of tank 14 for supporting ancillary equipment; a pump 18 mounted upon frame 16 for pressurizing the aqueous mixture; a spray nozzle unit or movable spray cannon 20 in fluid communication with pump 18 for spraying the pressurized mixture onto the ground surface; and, a mulch blower 22 positioned upon frame 16 for the spreading of dried mulch material atop the previously sprayed seed mixture upon the ground surface.

Figure 2:
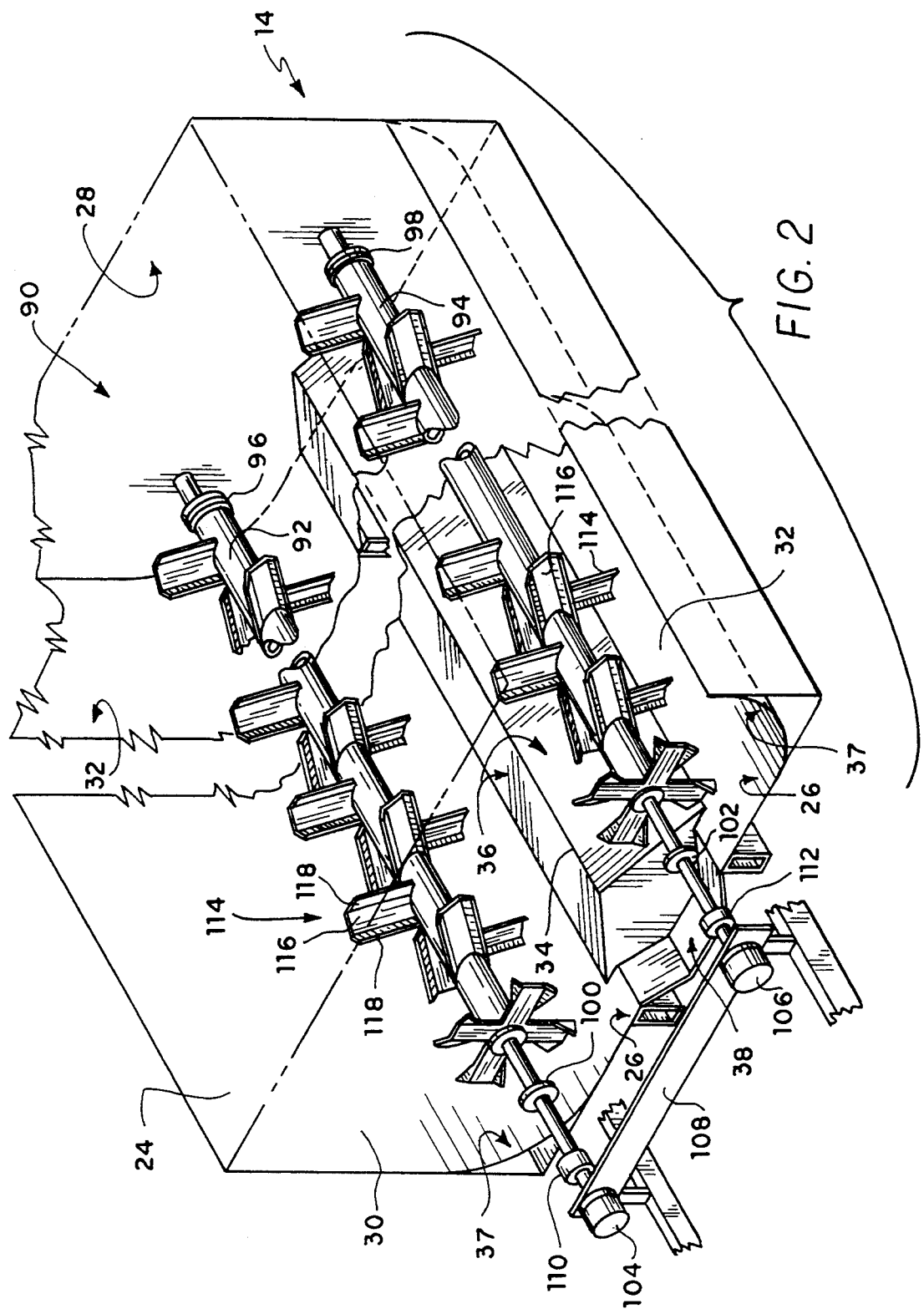
FIG. 2 is a perspective view of the mixing tank and agitator of the apparatus shown in FIG. 1, portions broken away to show details thereof.

With reference now to FIG. 2, tank 14 may be seen to include top, bottom, front, rear and side walls 24, 26, 28, 30, 32 respectively. Preferably, each of the tank walls is constructed of smoothly finished metal sheet material except for top wall 24 which includes a textured, non-slip, exterior surface and a guard rail 25 at the marginal perimeter thereof for reducing the likelihood of slip and fall injuries should the surface became wet during use. To promote the adequate mixing of materials disposed within tank 14, and to retain solids in suspension within the aqueous mixture, several of the aforesaid walls have been provided with structural relief features. For instant, bottom wall 26 is provided with a raised axial ridge 34, running substantially the length of tank 14, bisecting bottom wall 26 and defined by a substantially horizontal line formed by the juncture of two upwardly sloping planes 36. Additionally, the connection between bottom wall 26 and each side wall 32, rather than being another linear feature formed by the juncture of two planar surfaces, is defined by a curved transition surface 37 on each side of tank 14. Fitted beneath curved transition surface 37 are a plurality of cabinets, as at 39, for tool storage. Further, bottom wall 26 is provided with a well or sump 38 positioned adjacent axial ridge 34 for receiving drainage from tank 14.

Access to the interior of tank 14 is generally provided by an opening or hatch 40 in top wall 24 which may be closed by a pivotally hinged lid 42. Closely fitted within hatch 40 are two inner grates 44 for preventing large objects from inadvertently falling into tank 14 when lid 42 is open. Grates 44, pivotally hinged in a manner similar to that of lid 42, each comprise a rectangular metal frame 46 having a plurality of longitudinal spars, as at 48, connecting opposing sides thereof and reinforced by a lateral brace 50 connecting said spars. When viewed from the side, brace 50 may be seen to be pyramidal in form and culminating at a pointed end or apex 52. Apex 52 facilitates the lacerating or tearing of paper or plastic bags of seed, mulch, fertilizer, and other solid material to be dispensed into tank 14 through hatch 40.

An open frame 16 joined to tank 14 supports much of the ancillary equipment of the instant apparatus. Frame 16 has a rectangular and horizontal base 54, vertical posts, 56, 58, 60, and 62 extending vertically upward from base 54, and a top covering or roof 64 mounted above the posts. Roof 64 includes a textured, non-slip, upper surface similar to that provided to the top wall 24 of tank 14 also for reducing the likelihood of slip and fall injuries. Between posts 56 and 58, and positioned at regularly spaced intervals, are horizontal ladder rungs, as at 65, for permitting an individual to ascend onto roof 64 and top wall 24 of tank 14. Many components of the filling, mixing, pumping, and blowing systems described hereinafter are mounted to frame 16.

Generally, water is delivered to mixing tank 14 from a remote water source. Fluid communication between this source and tank 14 is established through a flexible conduit (not shown) attached to a suction hose connector 66 provided with an appropriate coupling or threaded fitting. When the source does not possess a hydrostatic head sufficient to deliver water at a desired rate of flow to tank 14, water may be drawn by means of a water pump 68 in fluid communication with connector 66 by conduit 70 having a three inch diameter. Preferably, pump 68 is a self-priming, centrifugal pump driven by a hydraulic motor 69 suitably joined thereto.

Water discharged from pump 68 enters a fill conduit 71 having a three inch diameter for transmittal to tank 14. Fluid flow through conduit 71 may be restricted or altogether abated by the manual closing of a valve 72 positioned upon conduit 71. Visual inspection of the water discharge into tank 14 is provided at the tank fill port 74, a bore or hole in top wall 24 surrounded by a vertically oriented cylinder of formed metal sheet material 76 joined to wall 24, where a gap between the fill conduit outlet 78 and the port permits the introduction of water into tank 14 to be seen.

An auxiliary water tank 80 securely joined to the top of tank 14 permits a volume of water to be stored for later use. In the preferred embodiment, auxiliary tank 80 has a sixty gallon capacity and is constructed of a fiberglass composite material because of its great strength, durability, and relative lightness. Nevertheless, it is realized that a variety of watertight materials may be utilized for this purpose without affecting the function of the instant invention. An auxiliary tank conduit 82 having a one and one half inch diameter and having opposed ends in fluid communication with water pump 68 and auxiliary tank 80 provides the means for filling tank 80. The rate of fill of tank 80 may be regulated by the manipulation of a manual valve (not shown) positioned upon conduit 82 near pump 68. Obviously, opening the manual valve increases the fill rate while closing the valve decreases such. Discharge from tank 80 may be directed to mixing tank 14 through a conduit 86 having a manually actuated valve 88 for regulating fluid flow therein. Water from auxiliary tank 80 may be utilized to flush mixing tank 14 after use or as a source of wash water for the exterior surfaces of apparatus 10.

For an even distribution of the sprayed aqueous mixture upon the ground surface, it is important that the suspended solids in tank 14 may be maintained equally disbursed through the mixture. To this end, a mixer or agitator 90, comprising two parallel and rotatable shafts 92 and 94 disposed within tank 14, is provided. As may be seen in FIG. 2, parallel shafts 92 and 94 run the length of tank 14, are disposed near bottom wall 26 thereof, and are substantially parallel to axial ridge 34. The front ends of shafts 92 and 94 are respectively mounted in bearings 96 and 98 carried by front wall 28 of tank 14, while the opposite ends extend through rear wall 30 and are respectively journaled in sealed bearings 100 and 102 carried by that wall. Shafts 92 and 94 are driven by separate hydraulic motors 103 and 106 mounted upon a horizontal stabilizer bar 108 positioned a short distance from, and parallel to, rear wall 30. Motors 104 and 106 are respectively coupled to parallel shafts 92 and 94 through power transition components 110 and 112. Preferably, power transition components 110 and 112 comprise well known chain-type shaft couplers. However, universal joints may be employed for this purpose. Shafts 92 and 94 are each provided with a plurality of spaced, radiating, agitator blades or paddles 114 secured as shown in FIG. 2. Each paddle 114 includes three components: a substantially rectangular, medial portion 116 for angular connection to the shaft, and two, like, planar, wing portions 118 angularly joined to opposed sides of medial portion 116 so as to form a substantially U-shaped implement. Because of the angular positions of paddles 114, the edges thereof cut through a substantial volume of the aqueous mixture at all times when used. Further, all of the paddles 114 are so positioned that the ends thereof are equidistant from the longitudinal axis of the shaft to which they are joined and the wing portions, 118, thereof cut through the aqueous mixture as the shaft rotates thereby assisting in efficiently moving the aqueous mixture about tank 14 in a propeller-like fashion.

The aqueous mixture is typically sprayed over the ground surface through a spray nozzle unit or cannon 20, the horizontal and vertical sweep of which may be controlled through the movement of a handle 122 manipulated by an operator positioned atop the apparatus. Spray cannon 20 includes a riser conduit 124 in direct fluid communication with the discharge port 126 of centrifugal pump 18 as well as spray nozzle 130, spray nozzle 130 being, then, in fluid communication with tank 14. Rotational torque is supplied to centrifugal pump 18 by a fixed displacement, hydraulic motor 129 mounted on base 54. Motor 129 is coupled through shaft 133 by means of universal joint 135 to pump 18 whose rotation may also be controlled, as will be later described, by the operator while positioned atop apparatus 10.

Preferably, pump 18, connected to sump 38 of tank 14 through suction conduit 131, is a heavy duty centrifugal pump such as the well-known Model No. 13A2-B manufactured by Gormann-Rupp Company of Mansfield, Ohio. The Gormann-Rupp pump includes a self-cleaning impeller permitting such to be used in applications involving liquids having a heavy solids content as is normally encountered when spraying seed and other soil conditioning materials. Furthermore, the discharge position of the Gormann-Rupp pump may be readily adjusted to permit rapid installation and adjustment.

Two auxiliary fluid outlets 132 and 134, defined by suitable pipe couplings, are positioned upon riser conduit 124 immediately above pump discharge port 126. Upon each of outlets 132 and 134 is detachably secured a single valve, labeled 136 and 138 respectively. When remotely actuated valve 140 positioned upon riser conduit 124 is closed, the pressurized aqueous mixture may be directed through either of outlets 132 and 134. By opening manually operable valve 138, the mixture may be delivered through conduit 144 to an auxiliary hose 142 of flexible material having a spray nozzle 141 at its distal end coiled for storage upon a rotatable reel 146. Hose 142 may be manually unspooled from reel 146 during use thereby permitting the aqueous mixture to be delivered to soil areas, remote from tank 14, which could not otherwise be accessed by cannon 20. After use of hose 142, such may be spooled upon 146 until needed once again. With the opening of remotely actuated valve 136, on the other hand, the aqueous mixture may be drawn from tank 14 through pump 18 and returned through recirculation conduit 133 in fluid communication with pump 18 to mixing tank 14. In this manner, sump 38 in the bottom of tank 14 and suction conduit 131 may be kept clear of solids settling from suspension in the aqueous mixture by keeping the aqueous mixture circulating therethrough.

Figure 5:
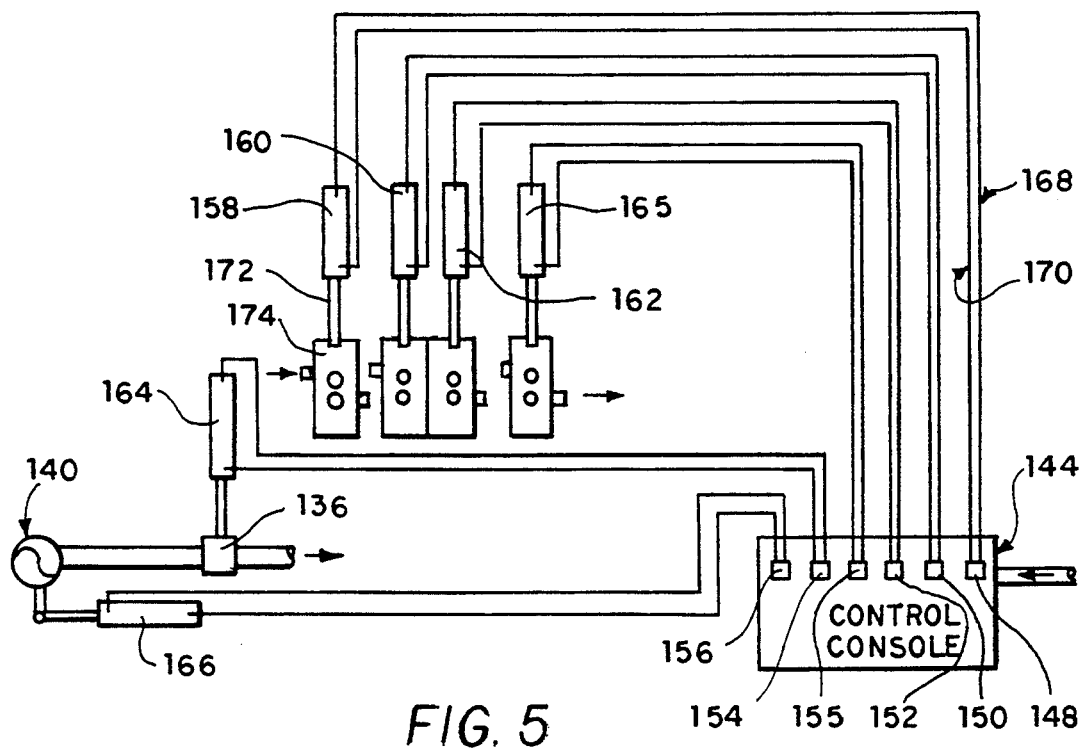
FIG. 5 is a schematic view showing the pneumatic control system of the apparatus of FIG. 1.

Control table or console 145 mounted upon supporting pedestal 147 provides an operator of the instant apparatus with means for actuating various hydraulic controls. As may be seen schematically in FIG. 5, six, 3-way, manual air valves, 148, 150, 152, 154, 155, and 156 are included atop console 144 for controlling, respectively: hydraulic motors 104 and 106 for rotating shafts 92 and 94 within tank 14, hydraulic motor 129 for supplying torque to centrifugal pump 128, hydraulic motor 69 for supplying torque to water pump 68, valve 136 for recirculating the aqueous mixture to mixing tank 14, hydraulic motor 192 for supplying power to mulch blower 22, and valve 140 for supplying cannon 120 with aqueous mixture. Manual air valves 148, 150, 152, 154, 155, and 156 regulate gas flow between a compressed air source (not shown), such as that included as standard equipment on many land vehicles, and, respectively, double acting air cylinders 158, 160, 162, 164, 165, and 166. The connection between each of the air cylinders and its controlling air valve is provided by two, small diameter air lines, as at 168 and 170. Working in cooperation with each of air cylinders 162, 164, 165, and 166 is a hydraulic control valve, as at 174, for directing pressurized hydraulic fluid to a hydraulic motor and reversing motor rotation when the appropriate valves are manipulated by the operator at console 144.

By way of example, air may be directed through air valve 148 into line 168 thereby causing a piston rod 172 to extend from air cylinder 158. In the extended position, rod 172 actuates hydraulic control valve 174 which, in turn, permits hydraulic fluid to flow through and drive motors 104 and 106 in a "forward" direction. By manually resetting air valve 148 to the second of its three designated positions, a small volume of compressed air may be directed into line 170 thereby retracting rod 172 to a medial or "neutral" position, repositioning the internal mechanism of hydraulic control valve 174, and stopping the rotation of drive motors 104 and 106. Finally, by adjusting air valve 148 to the third of its designated positions, rod 172 may be fully retracted within air cylinder 158 again repositioning the internal mechanism of hydraulic control valve 174 thereby causing drive motors 104 and 106 to rotate in a "reverse" sense or direction. Similarly, an operator may control the operation of two remote valves, 136 and 140, for directing the flow of the aqueous mixture through the instant apparatus as well as motors 69, 129, and 192 performing necessary pumping and blowing functions.

Figure 6:
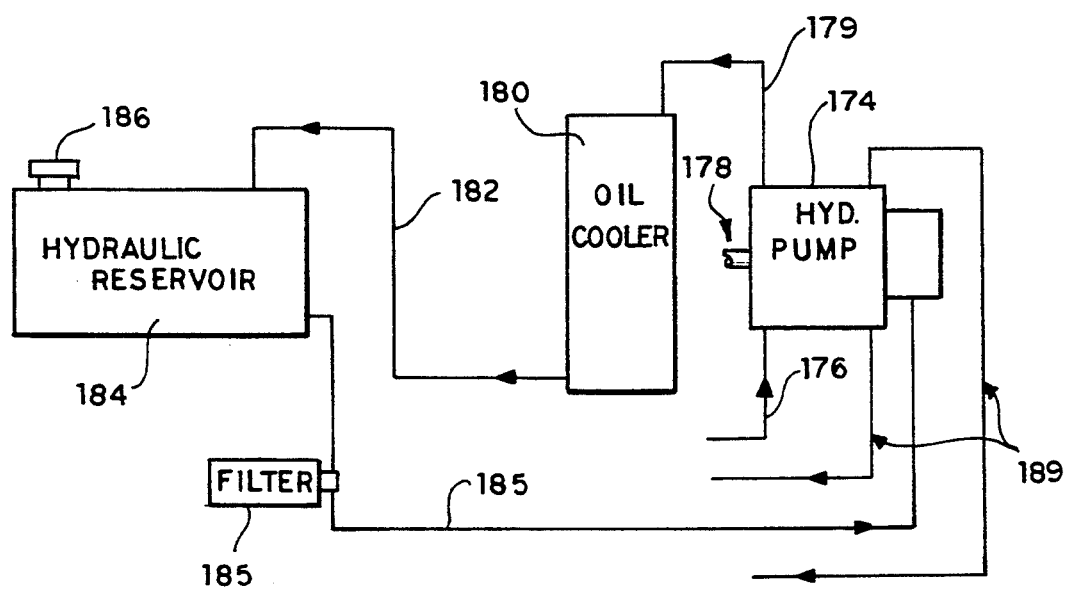
FIG. 6 is a schematic view of the hydraulic power system of the instant apparatus.

As may be seen schematically in FIG. 6, hydraulic pump 174 provides a means for pressurizing a suitable hydraulic oil or fluid. In the preferred embodiment, pump 174 is mounted upon front bumper (not shown) of truck 12. Extending from pump 174 is a rotatable shaft 178 engageable with a power take-off (not shown) defined by a rotatable shaft geared to the vehicle's engine and extending from the front of truck 12. Power take-offs of this type are well known and are standard equipment on many of land vehicles of the day. As the power take-off does not form part of the instant invention, a detailed description thereof will not be provided.

As may be seen in FIG. 6, representing in schematic fashion the means for providing hydraulic motors 69, 104, 106, 129, and 192 of sufficient capacity for their intended purposes with motive power, pump 174 is shown coupled with a plurality of hydraulic flow lines leading to an unseen motor. Preferably, pump 174 is capable of a peak output flow rate of approximately eighty gallons per minute with a maximum discharge pressure of six thousand pounds per square inch, such as Model Nos. 46 and 54 manufactured by Eaton Corporation of Eden Prairie, Minn., thereby providing ample power to the motors. It may be seen that hydraulic fluid, returning to pump 174 from the motor through motor case drain line 176 is directed through pump 174 to pump case drain line 179 in fluid communication with oil cooler or heat exchanger 180 for reducing the temperature of the hydraulic fluid.

From heat exchanger 180, hydraulic fluid is flowed through a reservoir return line 182 to transmission reservoir or tank 184 for temporary storage, and finally to filter 185 for the removal of foreign debris. Hydraulic reservoir 184 is provided with a reservoir fill cap and breather 186 and a drain valve 188 (FIG. 1) joined to the side of the apparatus for easy access. As may be appreciated from an examination of FIGS. 1 and , reservoir 184 is fitted beneath the curved portion of bottom wall 26 of tank 14, i.e., curved transition surface 37 at the front of the apparatus, surface 37 forming the top of reservoir 184. Hydraulic fluid exiting reservoir 184 returns to pump 174 through inlet line 185 where it is pressurized and delivered via parallel high pressure lines 189 to motor 69 for rotation thereof. Separate headers (not shown) are preferably provided in apparatus 10 for consolidating the flow of hydraulic fluid traveling through separate lines, as described above, between pump 174 and hydraulic motors 69, 104, 106, 129, and 192.

A critical component of the instant apparatus, and heretofore essentially undiscussed, is mulch blower 22. Mulch blower 22 comprises: circular fan housing 190, hydraulic motor 192, flailing chamber housing 194, and exit passage 196 having an adjustable spout 198 for controllable ejection and spreading of dried mulch material.

Fan housing 190 comprises two substantially circular and opposed side walls 200 and 202 joined by a radial wall 204 to form an open disk when viewed from the side. Each of side walls 200 and 202 are provided with a single centrally positioned bore, designated 206 and 208 respectively. Bore 206 has a diameter sufficient to permit the free rotation of shaft 210 joining hydraulic motor 192 with fan and flailing assembly 212. Bore 208, on the other hand, has a diameter sufficiently large to permit the passage of finely shredded or flailed dried mulch material from flailing chamber housing 194 to the interior of fan housing 190 and simultaneously prohibiting the passage of large clumps or clods of such material. A conically shaped motor support and guard 214 is removably secured to the exterior surface of side wall 200. Support 214 provides a suitable mounting base for hydraulic motor 192 adjacent fan housing 190 and in axial alignment with fan and flailing assembly 212. Also, support 214 isolates connecting element 216, preferably a universal joint or alternatively a chain coupling, from the area adjacent reel 146 (FIG. 1) thereby protecting individuals from the rotating element.

As may be seen in FIG. 3, horizontal shaft 210 extends substantially through mulch blower 22 and provides a means for flailing dried mulch material. The output shaft 218 of hydraulic motor 192 is joined to one end of horizontal shaft 210 which extends from connecting element 216, through bearing 220, through fan housing 190, through flailing chamber 194, to bearing 222 mounted on flailing chamber end wall 242 with the second end of the shaft being retained by bearing 222. Bearings 220 and 222 are affixed by means of threaded fasteners (not shown) to their respective supporting surfaces and preferably are internally sealed to extend the service life thereof. Fixably attached to, and radiating from, shaft 210 within housing 190 is fan 228 comprised of a plurality of planar paddles or blades, as at 191, each reinforced by two substantially perpendicular guide members, as at 193, best seen in FIG. 4. When fan 228 is employed for its intended purposes, the guide members assist in delivering mulch material from fan housing 190 by retaining the circulating material within the sweep of the fan blades. Also, fixably attached within flailing chamber 194 by means of suitable collars to shaft 210 are chains, as at 224, for flailing bailed and dried mulch material when shaft 210 is rotated.

With reference to FIGS. 3 and 4, flailing chamber housing 194 comprises: a horizontally oriented planar bottom wall 236, a horizontally oriented planar top wall 238, and a substantially vertical planar back wall 240 which all extend between vertical end wall 242 and side wall 202 of fan housing 190. Housing 194 may be seen to have a rectangular appearance when viewed in cross section. Positioned within housing 194 and joining end wall 242 to side wall 202 is flailing chamber wall 244 having a downwardly extending and essentially straight portion 246, a semicircular portion 248, and an upwardly extending and essentially straight portion 250 substantially parallel to portion 246. Flailing chamber wall 244 is configured to define a semicircle of constant radius with respect to shaft 210 as a path is traveled from wall portions 246 to 250 and further defines between walls 202 and 242 a flailing chamber 252 having a partially circular appearance when viewed in cross section. A plurality of air induction holes or bores, as at 254, opening into flailing chamber 252 are provided in end wall 242. These holes permit the entry of air into mulch blower 22 in an orientation parallel to that of shaft 210 increasing the horizontal or lateral air flow velocity from flailing chamber 252 into the interior of fan housing 190 when the blower is utilized and thereby increasing the volume of dried mulch material per unit of time which may be delivered to the ground surface through movable spout 198.

In use, seed, fertilizer and other solid material may be introduced into tank 14, previously filled with water delivered through pump 68, by rotating lid 42 to a vertical orientation and pouring into hatch 40. Hydraulic pump 174 is engaged with power take-off (not shown) pressuring the flow of hydraulic fluid. Manual air valve 148 is moved to actuate motors 104 and 106 and agitator 90. When the aqueous mixture has been sufficiently mixed, spray pump 128 may be caused to withdraw the aqueous mixture from tank 14 by actuating manual air valve 156. Finally, the aqueous mixture may be delivered to the ground surface by actuating air valve 156, opening cannon valve 140 and permitting the mixture to flow to nozzle 130. Once a sufficient quantity of aqueous mixture has been delivered to the ground surface, dried mulch material may be applied as a covering.

In operating mulch blower 22, opened bales of dried mulch material such as straw or hay are deposited upon a chute 226 leading to an opening (not shown) in the top of flailing chamber 252 and pushed therein by the operator. Gravity, also, partially assists the operator by drawing the baled material into chamber 252. With shaft 210 and, in turn, fan 228 and chains 224 being rotated at the proper rate by hydraulic motor 192, the mulch material is shredded by chains 224, drawn into fan housing 190 through bore 208 under the influence of the vacuum created by the rotation of fan 228, and finally, expelled upward by fan 228 into discharge elbow 230 constructed of properly folded metallic sheet material and out of manually adjustable and movable spout 198. The position of the movable spout 198 is manually adjustable by means of a substantially U-shaped handle 232 secured to spout 198 which is pivotally secured to elbow 230.

In addition to the vertical orientation of spout 198 being manually adjustable by handle 232, such is also effective to rotatably adjust spout 198 to any desired position with respect to fan housing 190 and the remainder of the apparatus. The orientation of spout 198 may be adjusted in this manner since it is rotatably affixed via sealed bearing 234 at the junction between discharge elbow 230 and exit passage 196 which interconnects an outlet (not shown) in the top of fan housing 190 with a circular inlet (not shown) in the lower portion of elbow 230. Thus, a passage for flailed mulch material out of fan housing 190, into elbow 230 and out of spout 198 onto the ground surface is provided. The rotatable and angular elevation adjustment of spout 198 under the control of handle 232, permits the flailed and shredded mulch material to be spread over the ground surface in a controlled manner.

It may be appreciated from the foregoing that an apparatus for seeding mulching, and fertilizing soil provided in accordance with the instant invention is advantageous in that by combining in a single apparatus means for delivering aqueous and dried materials to the round surface, applications that heretofore required two, separate and large pieces of equipment to perform can now be performed with greater ease, efficiency, and economy.

It is to be understood that the present invention is not limited to the sole embodiment described above, but encompasses any and all embodiments within the scope of the following claims.

I claim:

1. An apparatus for seeding, mulching, and fertilizing soil, comprising:

a tank for containing an aqueous mixture of soil conditioning materials, said tank including a bottom wall having a raised axial ridge running substantially the length of said tank, and an agitator positioned within said tank having a plurality of rotatable shafts running the length of sand tank and substantially parallel to said axial ridge; and a plurality of paddles joined to each said rotatable shaft for mixing the aqueous mixture of soil conditioning materials when said rotatable shaft is rotated, means in fluid communication with said tank for spraying the aqueous mixture onto the soil surface; and means affixed to said tank for blowing dried mulch material atop the previously sprayed aqueous mixture on the soil surface, said blowing means includes a flailing chamber positioned adjacent said tank, a drive shaft extending through said chamber, and a plurality of chains with each of said chains having one of its ends affixed to said drive shaft for flailing dried mulch material placed within said chamber.

2. The apparatus for seeding, mulching, and fertilizing soil according to claim 1 wherein said bottom wall further includes a sump positioned adjacent said axial ridge for draining said tank of an aqueous mixture of soil conditioning materials.

3. The apparatus for seeding, mulching, and fertilizing soil according to claim 1, including:

an inner grate having a lateral brace with a pointed apex for opening bags of soil conditioning material prior to dispensing into said tank, said grate pivotally fitted within an opening in said tank.

4. The apparatus for seeding, mulching, and fertilizing soil according to claim 1 wherein said paddles have a substantially U-shaped cross section.

5. The apparatus for seeding, mulching, and fertilizing soil according to claim 1 wherein said spraying means includes:
a movable spray cannon having a first spray nozzle in fluid communication with said tank for controllably delivering an aqueous mixture of soil conditioning materials to the soil surface.

6. The apparatus for seeding, mulching, and fertilizing soil according to claim 5 wherein said spraying means further includes:
an auxiliary hose of flexible material having a second nozzle in fluid communication with said tank for controllably delivering an aqueous mixture of soil conditioning materials to the soil surface.

7. The apparatus for seeding, mulching, and fertilizing soil according to claim 1 wherein said tank includes a bottom and a side wall joined by a curved transition surface and including at least one cabinet for tool storage fitted beneath said curved transition surface.

8. The apparatus for seeding, mulching, and fertilizing soil according to claim 1 wherein said blowing means include:
a flailing chamber positioned adjacent said tank;
a drive shaft extending through said chamber; and,
a plurality of chains with each having one of its ends affixed to said drive shaft for flailing dried mulch material placed within said chamber.

9. The apparatus for seeding, mulching, and fertilizing soil according to claim 1 wherein said blowing means includes:
a fan housing positioned adjacent said tank;
a drive shaft extending through said housing; and,
a plurality of paddles fixably attached to said drive shaft for ejecting shredded dried mulch material from said housing when said shaft is rotated.

10. The apparatus for seeding, mulching, and fertilizing soil according to claim 9 wherein each of said paddles includes:
a planar surface fixably attached to said drive shaft and at least one guide member perpendicularly joined to said planar surface for reinforcing said planar surface.

11. The apparatus for seeding, mulching, and fertilizing soil according to claim 9 wherein said blowing means further includes:
a movable spout positioned above said fan housing for manually directing dried mulch material onto the soil surface.

12. An apparatus for seeding, mulching, and fertilizing soil, comprising:
a tank mounted upon a motorized land vehicle for containing an aqueous mixture of soil conditioning materials;
means in fluid communication with said tank for spraying the aqueous mixture onto the soil surface, said spraying means including a pump; and
means connected to said pump for transmitting power from the motor of the land vehicle thereto; and
means affixed to said tank for blowing dried mulch material atop the previously sprayed aqueous mixture on the soil surface.

13. The apparatus for seeding, mulching, and fertilizing soil according to claim 12, including:
an agitator positioned within said tank having a plurality of rotatable shafts running the length of said tank and substantially parallel to said axial ridge; and
a plurality of paddles joined to each said rotatable shaft for mixing an aqueous mixture of soil conditioning materials when said rotatable shaft is rotated.

14. An apparatus for seeding, mulching, fertilizing soil, comprising:
a tank for containing an aqueous mixture of soil conditioning materials, said tanks including:
a bottom wall having a raised axial ridge running substantially the length of the tank for facilitating the mixing of an aqueous mixture of soil conditioning materials contained therein;
an agitator positioned with said tank having a plurality of rotatable shafts running the length of said tank and substantially parallel to said axial ridge;
a plurality of substantially U-shaped paddles joined to each said shaft for mixing an aqueous mixture of soil conditioning materials;
means in fluid communication with said tank for spraying the aqueous mixture onto the soil surface, said spraying means including:
a movable spray cannon having a first spray nozzle in fluid communication with said tank for controllably delivering an aqueous mixture of soil conditioning materials to the soil surface; and,
an auxiliary hose of flexible material having a second nozzle in fluid communication with said tank for controllably delivering an aqueous mixture of soil conditioning materials to the soil surface;
means positioned adjacent to said tank for blowing dried mulch material atop the previously sprayed aqueous mixture the soil surface, said blowing means including:
a flailing chamber positioned adjacent said tank;
a fan housing positioned adjacent said flailing chamber;
a drive shaft extending through said chamber and said housing;
a plurality of chains with each having one of its ends affixed to said drive shaft for flailing dried mulch material placed within said chamber;
a plurality of paddles fixably attached to said drive shaft for ejecting shredded dried mulch material from said housing when said drive shaft is rotated; and,
a movable spout positioned above said fan housing for directing dried mulch material onto the soil surface.

* * * * *